United States Patent
Palmer (10) Patent No.: US 9,614,785 B1
(45) Date of Patent: *Apr. 4, 2017

(54) I/O DATA INTERFACE FOR PACKET PROCESSORS

(71) Applicant: KNUEDGE INCORPORATED, San Diego, CA (US)

(72) Inventor: Douglas A. Palmer, San Diego, CA (US)

(73) Assignee: KnuEdge Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/500,694

(22) Filed: Sep. 29, 2014

Related U.S. Application Data (63) Continuation of application No. 13/749,558, filed on Jan. 24, 2013, now Pat. No. 8,848,726.

(51) Int. Cl.
*H04L 12/933* (2013.01)
*H04L 12/935* (2013.01)
*H04L 12/931* (2013.01)
*H04L 29/12* (2006.01)

(52) U.S. Cl.
CPC ........ *H04L 49/109* (2013.01); *H04L 49/3072* (2013.01); *H04L 49/352* (2013.01); *H04L 61/10* (2013.01)

(58) Field of Classification Search
CPC ........ H04W 84/18; H04W 40/02; H04L 45/74
See application file for complete search history.

(56) References Cited

U.S. PATENT DOCUMENTS

| | | | |
|---|---|---|---|
| 6,647,428 B1 | 11/2003 | Bannai et al. | 709/245 |
| 7,016,352 B1 | 3/2006 | Chow et al. | 370/392 |
| 7,035,292 B1* | 4/2006 | Giorgetta et al. | 370/509 |
| 8,189,352 B2 | 5/2012 | Ferguson et al. | 370/389 |
| 8,189,496 B2 | 5/2012 | Wittenschlaeger | 370/254 |
| 8,228,818 B2 | 7/2012 | Chase et al. | 370/253 |
| 8,228,929 B2 | 7/2012 | Aybay et al. | 370/412 |
| 8,713,305 B2 | 4/2014 | Liu et al. | 713/153 |
| 8,782,178 B2 | 7/2014 | Rosenberg | 709/220 |
| 2009/0122724 A1 | 5/2009 | Rosenberg | 370/255 |
| 2009/0190580 A1 | 7/2009 | Kailasam et al. | 370/389 |
| 2010/0036980 A1* | 2/2010 | Stedman et al. | 710/36 |
| 2010/0202368 A1* | 8/2010 | Hans | H04M 3/5116 370/329 |
| 2012/0300772 A1* | 11/2012 | Manzella | H04L 49/254 370/389 |
| 2013/0142205 A1* | 6/2013 | Munoz | H04L 45/08 370/419 |
| 2014/0032457 A1 | 1/2014 | Palmer et al. | 706/16 |
| 2014/0204943 A1 | 7/2014 | Palmer | 370/392 |

* cited by examiner

Primary Examiner — Jianye Wu
(74) Attorney, Agent, or Firm — Fish & Richardson P.C.

(57) ABSTRACT

Systems and methods to process packets of information use an on-chip information processing system configured to receive, resolve, convert, and/or transmit packets of different packet-types in accordance with different protocols. A first packet-type may use a protocol for wired local-area-networking (LAN) technologies, such as Ethernet. A second packet-type may use a proprietary protocol. The proprietary protocol may be used to exchange information with one or more packet processing engines, such as neural processing engines.

22 Claims, 2 Drawing Sheets

I/O DATA INTERFACE FOR PACKET PROCESSORS

FIELD OF THE INVENTION

The invention relates to information processing, in particular on-chip systems that provide and/or combine functionality using multiple protocols for information exchange.

BACKGROUND OF THE INVENTION

Information processing systems that process electronic information commonly use electronic storage to store electronic information, digital processors to process the stored electronic information, and busses, networks, or other logic to connect such electronic storage to such digital processors. Electronic information is commonly sent or transmitted by a source (or "origin") and received by one or more destinations. For example, the sources may include electronic storage. For example, the destinations may include the digital processors.

Information processing systems commonly distinguish "write" operations from "read" operations, wherein write operations may be used to store information, e.g. in electronic storage, and wherein read operations may be used to retrieve information, e.g. for use by a processor. Generally, transfers include electronic information being moved from one component to another. Write operations and/or read operations may include transfers. Information processing systems that are implemented within an integrated circuit or component may have operational advantages (e.g. speed, power, cost, etc.), as well as disadvantages (e.g. flexibility, modularity, scalability, etc.) compared to similar systems that are implemented using multiple separate circuits or components. As a result, physical boundaries between circuits and/or components deserve to be carefully contemplated during the design phase of information processing systems.

In information processing systems having more complicated topologies, hierarchies, and/or architectures, individual read and write operations may selectively be associated with one of multiple sources and/or destinations. In some cases, individual operations may be associated with multiple sources and/or destinations. For example, in information processing systems having one or more busses to connect multiple destinations, one or more appropriate/intended destinations may be distinguished from one or more inappropriate/unintended destinations by various means of disambiguation, such as the use of addresses. Based on the address, a read or write operation may be guided to and/or from a particular source and/or a particular destination.

SUMMARY

One aspect of the disclosure relates to an on-chip system of receiving, storing, transferring, and/or processing packets of information. As used herein, the term "information" may include "electronic information" and/or "digital information." As used here, "chip" may refer to an integrated circuit, and "on-chip" may refer to storage, transfer, and/or processing of information within an integrated circuit.

The on-chip information processing system may include electronic storage to store packets of information, in particular non-transitive electronic storage, for example one or more memory banks. As used herein, the term "memory bank" may refer to RAM, SRAM, DRAM, eDRAM, SDRAM, volatile memory, non-volatile memory, and/or other types of electronic memory. The storage capacity of the electronic storage may range from a few kilobytes to a few thousand petabytes, and/or any capacity in-between.

The on-chip information processing system may be configured to process and/or exchange information through one or more ports. The term "on-chip information processing system" may simply be referred to as "system." Information may be received by the on-chip information processing system through one or more ports. For example, information may be received through one or more input ports from one or more external sources. Information may be transmitted from the system through one or more ports. For example, information may be transmitted to one or more external destinations through one or more output ports. The functionality of input ports and output ports may be physically combined in bi-directional ports. Ports may be physical structures configured to transmit and/or receive electrical signals and/or values. The ports may have different characteristics, such as, by way of non-limiting example, providing support for different protocols of information exchange. Protocols may prescribe how to interpret signals and/or values received and/or transmitted through one or more ports. Protocols may not be a physical characteristic, even though a specification for a protocol may include physical characteristics, e.g. required electrical characteristics. Individual ports may be configured to support a particular protocol and/or type of information exchange. One or more ports may be configured to exchange information using a first protocol. One or more ports may be configured to exchange information using a second protocol, and so on for additional protocols.

The on-chip information processing system is not intended to be limited to using two different types of ports and/or two different types of protocols. In some implementations, the on-chip information processing system may be configured to support three, four, or more different types of ports, and/or different types of protocols. Some protocols may require point-to-point connections. Individual protocols may be supported by serial ports and/or parallel ports. One or more protocols may be standardized (e.g. internationally, through IEEE or another organization) and/or public protocols. In some implementations, one or more supported protocols may be a protocol for wired local-area-networking (LAN) technologies, a protocol using a Media Access Control address (MAC address), a protocol using a maximum payload size below 10000 bytes, and/or any combination thereof. One or more protocols may be proprietary. Individual protocols may correspond to individual types of information exchange and/or individual types of ports.

For example, information exchange may be in one direction or in two directions. Exchange in two directions may be multiplexed or may be full-duplex. For example, multiplexing may include time-multiplexing, frequency-multiplexing, and/or other techniques to accomplish multiplexing. Different characteristics for individual ports and/or protocols may include address-type, data-width, synchronization mechanism (e.g. a two-way handshake protocol, a four-way handshake protocol, etc.), one or more data rates, support for different types of operations, electrical characteristics (e.g. current, voltage, impedance, etc.) and/or other characteristics. Some supported types of information exchange may be based on packets of information. Different protocols may correspond to different types of packets. For example, a first protocol, supported by a first port, may use a first packet-type. A second protocol, supported by a second port, may use a second packet-type, and so on.

A packet of information may be a predetermined quantity of electronic information, albeit potentially a variable quantity, being arranged, organized, and/or formatted in a predetermined manner. Packets may be transferred and/or processed autonomously, e.g. independently from other packets.

Packets of certain packet-types may include one or more addresses. For example, packets of a first packet-type may include an address of a first address-type. Packets of a second packet-type may include an address of a second address-type, and so on. For example, in some implementations, one or more ports of the system may be configured to receive and/or transmit Ethernet packets, and/or packets using a protocol similar to and/or based on Ethernet. Such Ethernet packets may include an Ethernet address. By way of non-limiting example, the system may include a gigabit Ethernet port configured to support transfer at a data rate of at least 1 gigabit per second, at least 10 gigabit per second, at least 100 gigabit per second, and/or another suitable data rate. For example, in some implementations, one or more ports of the system may be configured to exchange information using serial ATA (SATA), and/or a protocol based thereon. For example, in some implementations, one or more ports of the system may be configured to exchange information using an external standardized bus interface. The standardized bus interface may be a peripheral component interconnect express (PCIe) bus, similar to a PCIe bus, and/or based thereon.

Packet-based communication may be used in (distributed) networks, such as, by way of example, the Internet, for various reasons. Decentralized networks may include multiple paths between some sources and some destinations. Originally based on queuing theory, packet-switching can be used to provide distributed, scalable, and robust communications, even in the presence of intermittent connectivity, long transmission delays, variable and/or high error rates, and/or other unfavorable operating conditions that may occur in certain types of networks. Similar conditions may not commonly be associated with on-chip communication (or even communication within the components of a printed circuit board). For example, communication within a chip commonly does not include multiple paths between some sources and some destinations. For example, communication within a chip commonly does not suffer from intermittent connectivity, long transmission delays, variable and/or high error rates, and/or other unfavorable operating conditions that may occur in networks. For these and other reasons, on-chip communication is usually based on other types of connections/topologies than communication within (distributed) networks. On-chip topologies may include one or more of point-to-point topologies, bus topologies, star topologies, tree topologies, and/or other topologies.

Communication within a chip or integrated circuit, regardless of topology, is commonly not based on packets. In the on-chip information processing systems described herein, packets of information may be a convenient quantity and/or format for information processing purposes, in particular for neural processing. By virtue of standardizing and/or matching the units of information used for the purposes of storage and transfer with the units of information used for the purpose of information processing, i.e. packets, the systems as described herein may be more efficient, simple, flexible, scalable, and/or otherwise preferred over similar systems that suffer from a proliferation of different types of connections, different protocols, different interfaces, different formats for communications, different units of information, and/or the problems in conversions and (design) verification associated therewith.

External sources of information (including, but not limited to, packets of information) may exchange information based on standardized protocols. Information processing systems, in particular systems using neural processing engines, may exchange information based on small packets of information. Such exchange of packets may be in accordance with a proprietary protocol. The on-chip information systems described herein may be configured to couple external sources of information with these information processing systems. Information processing systems, in particular systems using neural processing engines, may create and/or generate information. The system may be configured to process and/or exchange information between one or more (external) sources and one or more (external) destinations using different protocols. For example, in some implementations, one or more neural processing engines may be configured to generate information by converting and/or re-formatting information received from external sources of information. For example, the system may be configured to receive packets of a first packet-type and transmit packets of a second packet-type that is different from the first packet-type.

Created and/or generated information (e.g. received from one or more external sources of information) may be intended to be transmitted by the on-chip information processing system. Transmission may be in accordance with one or more appropriate protocols, to one or more external destinations of information. In some implementations, external sources of information may be external destinations of information.

The on-chip information processing system may include one or more high-speed serial ports configured to receive and/or transmit packets of a particular packet-type at a data rate of at least 10 Mbits per second, at least 100 Mbits per second, at least 1000 Mbits per second, and/or another suitable data rate. In some implementations, the system may include two or more such high-speed serial ports. In some implementations, individual high-speed serial ports may physically combine input and output functionality.

The particular packet-type may be in accordance with a proprietary protocol, e.g. a non-standardized protocol. Individual packets of this particular packet-type may include a packet header. Such packets and/or packet headers may include information and/or sets of values. The information and/or sets of values may include one or more of fields, operands, operator codes, address-mode indicators, source addresses, destination addresses, destination port indicators, and/or other information or values. Individual packets of information may include a packet payload, which may include a variable quantity of electronic information. Packets of this particular packet-type may be referred to as flit packets. Individual packets of this particular packet-type may range between a minimum bit size and a maximum bit size. The minimum bit size may be 32 bits, 64 bits, 128 bits, 256 bits, and/or another suitable minimum bit size. The maximum bit size may be 512 bits, 1024 bits, 2048 bits, 4096 bits, 8192 bits, and/or another suitable maximum bit size. For example, in some implementations, packets of this particular packet-type may range between 64 bits and 2048 bits.

A packet header for a packet of the particular packet-type may include, by way of non-limiting example, an address-mode indicator, one or more destination port indicators, and/or one or more addresses. An address-mode indicator may indicate which mode of operation is to be used to route a particular packet. Routing modes and/or routing schemes may include port-by-port routing, (relative or absolute) address-based routing, and/or other types of routing.

External destinations for transmission of information by the on-chip information processing system may include one or more packet processing engines. Packet processing engines may be configured to generate, receive, transmit, and/or process packets. Packet processing engines may be configured to route incoming packets to other packet processing engines and/or destinations as appropriate. In some embodiments, generation of one or more output packets may be responsive to receiving one or more packets. Output packets may be generated by processing one or more received packets. Packet processing engines may analyze and/or inspect a packet of information to determine whether to transmit and/or to process it.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
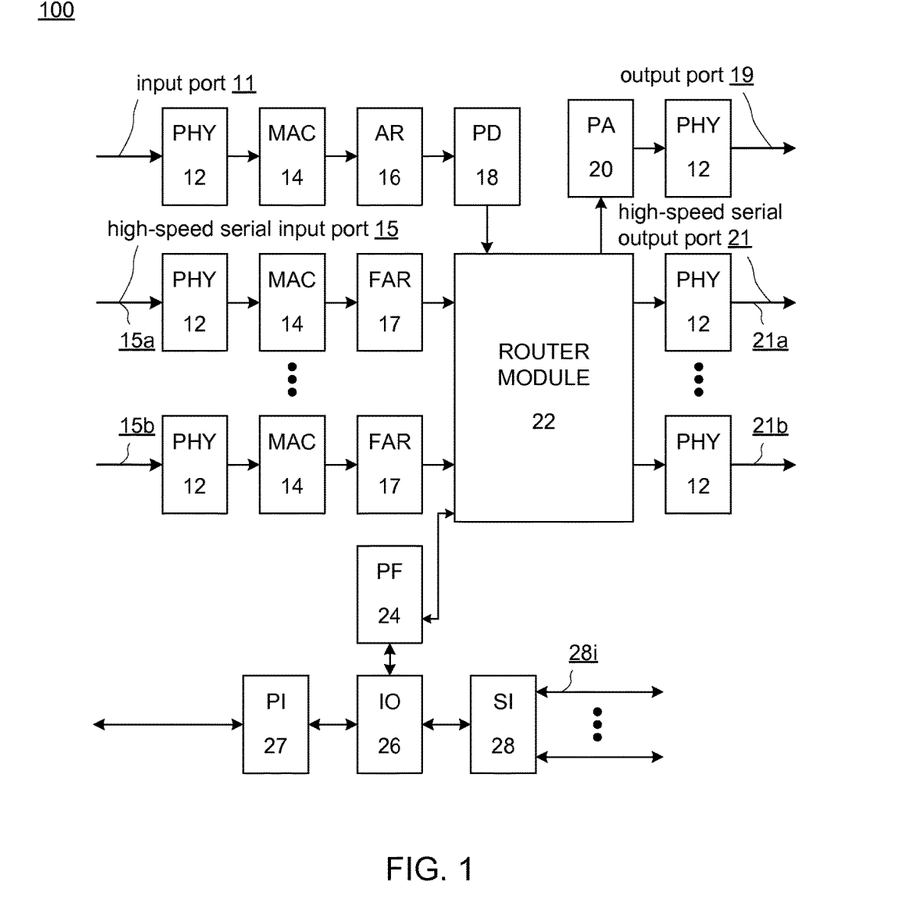
FIG. 1 illustrates an on-chip information processing system in accordance with one or more embodiments.

FIG. 1 illustrates an on-chip information processing system 100. On-chip information processing system 100 may interchangeably be referred to as system 100 or information processing system 100. System 100 may include one or more of an input port 11 configured to receive packets of a first packet-type, an address resolution module 16, a packet dicer module 18, a packet assembler module 20, an output port 19 configured to transmit packets of the first packet-type, one or more high-speed serial input ports 15 configured to receive packets of a second packet type, one or more secondary address resolution modules 17, one or more high-speed serial output ports 21, a router module 22, and/or other components.

Input port 11 of system 100 may be configured to receive packets at a data rate of at least 100 Mbits per second, 1 gigabit per second, 10 gigabit per second, 100 gigabit per second, and/or another suitable data rate. As used herein, 1 Mbit corresponds to $10^6$ bits. As used herein, 1 gigabit corresponds to $10^9$ bits. The packets received through input port 11 may be of a first packet-type. The first packet-type may be in accordance with a first protocol. The first protocol may be a standardized protocol (e.g. internationally, through IEEE or another organization), a protocol for wired local-area-networking (LAN) technologies, a protocol using a Media Access Control address (MAC address), a protocol using a maximum payload size below 10000 bytes, and/or any combination thereof. For example, the first protocol may be gigabit Ethernet, the first packet-type Ethernet packets. Packets of the first packet-type may include an address of a first address-type.

Output port 19 of system 100 may be configured to transmit packets at a data rate of at least 100 Mbits per second, 1 gigabit per second, 10 gigabit per second, 100 gigabit per second, and/or another suitable data rate. The packets transmitted through output port 19 may be of the first packet-type. The packet-type of output port 19 may be the same as the packet-type of input port 11. For example, output port 19 may be a gigabit Ethernet output port.

Address resolution module 16 of system 100 may be configured to resolve addresses of a particular address-type. The particular address-type may be in accordance with the first protocol and/or the packet-type of input port 11. Address resolution module 16 may be configured to receive packets from input port 11. In some implementations, packets from input port 11 are transferred through a module configured to provide the physical layer of the Open Systems Interconnect (OSI) model (or a model similar to and/or based thereon), also referred to as PHY and depicted as PHY 12 in FIG. 1. In some implementations, packets may be transferred from PHY 12 to a module configured to provide all or part of a data link layer of the OSI model (or a model similar to and/or based thereon). For example, such a module may be configured to provide a media access control (MAC) data communication protocol, also referred to as MAC and depicted as MAC 14 in FIG. 1. As shown, packets received by input port 11 may be transferred via PHY 12 and MAC 14 to address resolution module 16.

Packet dicer module 18 of system 100 may be configured to dice, split, and/or (re)format received packets into one or more packets of a second packet-type. The second packet-type may be different from the first packet-type of input port 11. Packets of the second packet-type may include an address of a second address-type. The second packet-type may be flit packets, described elsewhere in this disclosure. For example, in some implementations, packets of the second packet-type may range between 64 bits and 2048 bits.

Packet assembler module 20 of system 100 may be configured to assemble, join, group, and/or (re)format received packets of one packet-type into one or more packets of a different packet-type. For example, packet assembler module 20 may be configured to assemble one or more flit packets into one or more packets of the first-packet type of output port 19. For example, in some implementations, packet assembler module 20 may be configured to assemble multiple flit packets into an Ethernet packet. Packets from packet assembler module 20 may be transferred through a PHY 12 and through output port 19 to be transmitted off the on-chip system 100, as depicted in FIG. 1.

One or more high-speed serial input ports 15 of system 100 may be configured to receive packets of a particular packet-type at a particular data rate. The particular packet-type may be flit packets, described elsewhere in this disclosure. For example, in some implementations, packets of this particular packet-type may range between 64 bits and 2048 bits. Individual high-speed serial input ports 15 may be configured to receive packets at a data rate of at least 10 Mbits per second, at least 100 Mbits per second, at least 1000 Mbits per second, and/or another suitable rate. In some implementations, system 100 may include multiple high-speed serial input ports 15. As depicted in FIG. 1, system 100 may include multiple high-speed serial input ports 15, including a first high-speed serial input port 15*a*, a second high-speed serial input port 15*b*, and/or other high-speed serial input ports.

One or more high-speed serial output ports 21 of system 100 may be configured to transmit packets of a particular packet-type off system 100 at a particular data rate. The particular packet-type may be flit packets, described elsewhere in this disclosure. Individual high-speed serial output ports 21 may be configured to transmit packets at a data rate of at least 10 Mbits per second, at least 100 Mbits per second, at least 1000 Mbits per second, and/or another suitable rate. In some implementations, system 100 may include multiple high-speed serial output ports 21. As depicted in FIG. 1, system 100 may include multiple high-speed serial output ports 21, including a first high-speed serial output port 21*a*, a second high-speed serial output port 21*b*, and/or other high-speed serial output ports. In some implementations, the functionality of individual high-speed serial input ports 15 and individual high-speed serial output ports 21 may be physically combined in bi-directional high-speed serial ports.

One or more secondary address resolution modules 17 of system 100 may be configured to resolve addresses of a particular address-type. The particular address-type may be in accordance with a particular protocol and/or the address-type that corresponds to the packet-type of high-speed serial input port 15. In some implementations, secondary address resolution module 17 may be referred to as flit address resolution (FAR) module 17. Individual secondary address resolution modules 17 may be configured to receive packets from individual high-speed serial input ports 15. In some implementations, packets from high-speed serial input port 15 are transferred through a PHY 12 and a MAC 14 to secondary address resolution module 17, as depicted in FIG. 1.

Router module 22 of system 100 may be configured to receive packets from a set of packet sources and/or transmit packets to a set of packet destinations. In some implementations, router module 22 is configured to receive and transmit packets of the same packet-type. In some implementations, router module 22 is configured to receive and transmit flit packets, described elsewhere herein. The set of packet sources may include one or more of packet dicer module 18 and/or one or more secondary address resolution modules 17, and/or combinations thereof. The set of packet destinations may include one or more of packet assembler module 20 and/or one or more high-speed serial output ports 21. For example, system 100 may be configured to receive gigabit Ethernet packets through input port 11, convert the received packets into flit packets using packet dicer module 18, and route these flit packets through router module 22 such that the flit packets are transmitted off system 100 through high-speed serial output port 21. In some implementations, the set of packet destinations includes multiple PHY 12, individual ones of which are coupled to an individual high-speed serial output port 21, as depicted in FIG. 1.

The number of high-speed serial input ports 15 may correspond to the number of high-speed serial output ports. This number is not intended to be limited in any way by the depiction in FIG. 1. In some implementations, system 100 includes 4, 6, 8, 16, and/or another suitable number of sets of high-speed serial inputs and outputs.

System 100 may include one or more serial ATA (SATA) interfaces 28. An individual SATA interface (SI) 28 may include one or more SATA ports 28*i*. Information received through one or more SATA ports 28*i* and/or SI 28 may be transferred to router module 22. In some implementations, information received through one or more SATA ports 28*i* and/or SI 28 may be transferred via an IO controller 26 and/or a packet feeder 24 to router module 22.

In some implementations, IO controller 26 may include an independent direct memory access (DMA) processor. For example, IO controller 26 may be connected to and receive information from electronic storage, e.g. SRAM (not depicted in FIG. 1). In some implementations, IO controller 26 may further be configured to exchange information with a peripheral interface (PI) 27.

PI 27 may be a standardized bus interface, including but not limited to a peripheral component interconnect express (PCIe) bus, similar to a PCIe bus, and/or based thereon. For example, PI 27 may be configured to exchange information with (off-chip) electronic storage, e.g. DRAM (not depicted in FIG. 1), and/or an (off-chip) processing device, processor, micro-processor, digital circuit, controller, and/or otherwise programmable logic circuit. For example, an off-chip processing device may be an ARM processor. For example, information originating from an ARM processor may be transferred, via PI 27, IO controller 26, and packet feeder 24, to router module 22.

Packet feeder 24 may be configured to exchange, convert, transform, and/or (re)format information and/or packets between IO controller 26 and router module 22. For example, packet feeder 24 may be configured to convert information received through SI 28 (and IO controller 26) into one or more flit packets for transmission to router module 22. For example, packet feeder 24 may be configured to convert information received through PI 27 (and IO controller 26) into one or more flit packets for transmission to router module 22. In some implementations, the set of packet sources for router module 22 may further include packet feeder 24. In some implementations, the set of packet destinations for router module 22 may include one or more SATA ports 28*i*. For example, packet feeder module 28 may be configured to receive and convert flit packets from router module 22, and transfer these packets, via IO controller 26, to SI 28 and one or more SATA ports 28*i*.

In some implementations, router module 22 may be configured to support only one protocol for information exchange. For example, router module 22 may be configured to only support flit packets. Information received by system 100 using any other protocol and/or packet-type may be converted, transformed, and/or (re)formatted into one or more flit packets for routing to one or more of a set of packet destinations.

Figure 2:
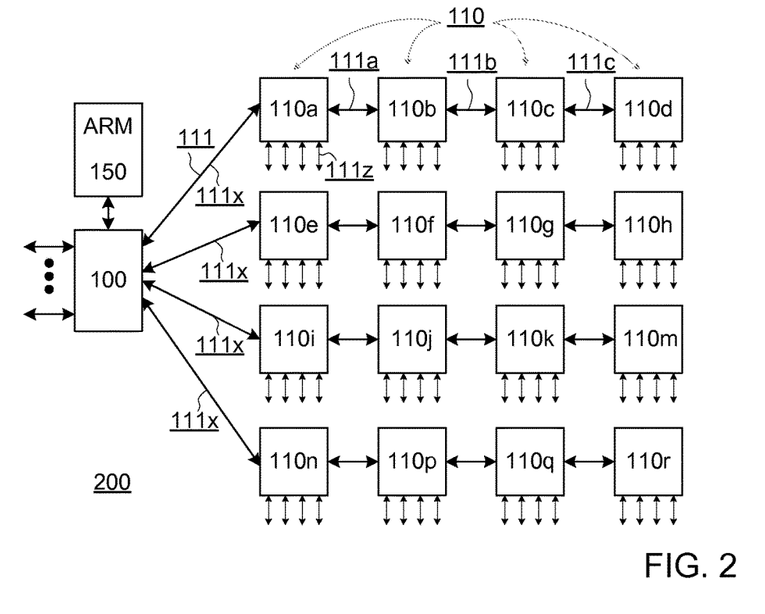
FIG. 2 illustrates a system including an on-chip information processing system in accordance with one or more embodiments.

System 100 may be used in information processing systems, in particular systems using packet processing engines and/or neural processing engines. By way of illustration, FIG. 2 illustrates an information processing system 200 that includes on-chip information processing system 100. System 200 may include an ARM processor 150, a set of packet processing engines 110, a set of connections 111, and/or other components. ARM processor 150 may be configured to exchange information with system 100 as described previously in relation to FIG. 1 and peripheral interface (PI) 27 of system 100.

Referring to FIG. 2, set of packet processing engines 110 may include engines "a" through "r" as depicted in FIG. 2. Individual packet processing engines 110 may include one or more ports configured to transmit and/or receive information. Individual packet processing engines 110 may include a dedicated port and a dedicated connection 111x that connects an individual packet processing engine 110 to system 100. Packet processing engines 110 may be arranged such that packets may be transferred and/or processed in a chain. For example, packets may be transferred and/or processed starting with engine 110a, via connection 111a, engine 110b, connection 111b, engine 110c and connection 111c, to engine 110d. The number of packet processing engines 110 in FIG. 2 is exemplary and not intended to be limiting in any way.

In some implementations, packet processing engine 110 may include one or more clusters that are the same as or similar to the system for neural processing (e.g. "system 200", also referred to as "group 200" and including multiple neural processing engines 220) described in U.S. patent application Ser. No. 13/560,890, filed Jul. 27, 2012, and entitled "NEURAL PROCESSING ENGINE AND ARCHITECTURE USING THE SAME", which is hereby incorporated by reference in its entirety into the present disclosure. This application may be referred to as "the '890 application" herein. For example, an individual packet processing engine 110 may include 8 such clusters ("system 200" in the '890 application) of 32 neural processing engines each (e.g. "neural processing engine 220" in the '890 application), or, in other words, 256 neural processing engines per individual packet processing engine. Note that these specific pluralities are exemplary and not intended to be limiting in any way.

Individual connections 111 may include physical, direct, and/or point-to-point connections, for example between ports of different components of system 100. Set of connections 111 may include a connection 111a, a connection 111b, a connection 111c, a connection 111x, a connection 111z, and/or other connections. Set of connections 111 may form a network between system 100 and packet processing engines 110.

In some implementations, system 200 may use routing schemes that are the same as or similar to the routing schemes described in relation to routing system 100 described in U.S. patent application Ser. No. 13/749,402, filed Jan. 24, 2013, and entitled "SYSTEMS AND METHODS FOR PACKET ROUTING", which is hereby incorporated by reference in its entirety into the present disclosure. This application may be referred to as "the '402 application" herein.

In some implementations, packet processing engine 110 may include one or more components that are the same as or similar to the components of the on-chip processing system (e.g. "system 100") described in U.S. patent application Ser. No. 13/705,999, filed Dec. 5, 2012, and entitled "SMART MEMORY", which is hereby incorporated by reference in its entirety into the present disclosure. This application may be referred to as "the '999 application" herein.

System 200 of FIG. 2 may be configured to perform various tasks and/or applications. For example, the applications described in the '890, '402, and '999 applications may be performed by system 200, including but not limited to pattern matching/recognition, vision search, data sorting, database operations, parallel processing, natural language processing, matrix computation, financial transactions, internet packet inspection, cyber security, video server, and/or other applications. System 200 may be configured to receive information, e.g. through a gigabit Ethernet port of system 100, and, under control of ARM 150, distribute the received information, be it a large chunk or streaming data, to the set of packet processing engines for (parallel) processing (e.g. analysis).

Figure 3:
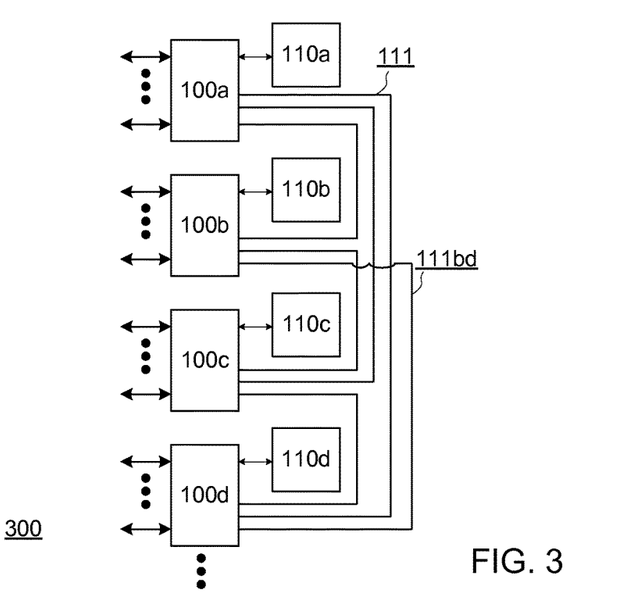
FIG. 3 illustrates a system including multiple on-chip information processing systems in accordance with one or more embodiments.

The use of system 100 is not limited to system 200. Other architectures, topologies, and/or configurations are contemplated and considered within the scope of this disclosure. By way of illustration, FIG. 3 illustrates a system 300 including a set of connections 111, a set of packet processing engines 110, multiple on-chip information processing systems that are similar to or the same as system 100 of FIG. 1, and/or other components. Referring to FIG. 3, system 300 may include 4 on-chip information processing systems, including system 100a, system 100b, system 100c, and system 100d. The number of on-chip information processing systems depicted in FIG. 3 is not intended to be limiting in any way. In some implementations, each of the 4 on-chip information processing systems (100a-100d) may be connected, via a connection 111, to the other on-chip information processing systems. For example, system 100a may be connected to system 100b, system 100c, and system 100d. For example, the connections between system 100b and 100d may be referred to as connection 111bd. In some implementations, the set of connections 111 may be configured to use flit packets as described elsewhere herein. Alternatively, and/or simultaneously, the set of connections 111 may be configured to use another packet-type. Furthermore, individual ones of the on-chip information processing systems may be connected, via an individual connection 111, to an individual packet processing engine 110. System 300 may be configured such that systems 100a-100d exchange flit packets with packet processing engines 110a-110d.

The same references made, in relation to system 200, to the '890, '402, and '999 applications, may be applied to system 300. For example, packet processing engine 110 may include one or more clusters that are the same as or similar to the system for neural processing (e.g. "system 200") described in the '890 application. An example of an application for system 300 may be an Ethernet switch. For example, in some implementations, system 300 may be scaled up and include 192 on-chip information processing systems the same as or similar to system 100 of FIG. 1. It is noted that other combinations and permutations of on-chip information processing systems that are the same as or similar to system 100 in FIG. 1 and packet processing engines that are the same as or similar to packet processing engine 110a in FIGS. 2-3 are contemplated and considered within the scope of this disclosure. For example, in some implementations, features and functionality of system 200 (in FIG. 2) and system 300 (in FIG. 3) may be combined to form additional systems.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. An on-chip information processing system comprising:
    a first input port configured to receive packets of a first packet-type at a first data rate that each include an address of a first address-type;

a packet dicer module configured to dice the received packets of the first packet-type into one or more packets of a second packet-type that each include an address of a second address-type in a packet header;

one or more second input ports configured to receive packets of the second packet-type at a second data rate;

one or more second output ports configured to transmit packets of the second packet-type off the on-chip system at the second data rate, wherein the first data rate is faster than the second data rate; and a router module configured to receive packets of the second packet-type from a set of packet sources and transmit packets of the second packet-type to a set of packet destinations, wherein the set of packet sources includes the packet dicer module and the one or more second input ports, wherein the set of packet destinations includes the one or more output ports.

2. The system of claim 1, wherein the received packets of the first packet type are in accordance with a protocol for wired local area networking (WLAN) technologies.

3. The system of claim 1, further comprising:
an address resolution module configured to resolve addresses of the first address type, wherein the address resolution module is configured to receive packets from the first input port.

4. The system of claim 1, further comprising:
a first output port configured to transmit packets of the first packet type off the on-chip system; and
a packet assembler module configured to assemble packets of the first packet type from one or more packets of the second packet type for transmission through the first output port.

5. The system of claim 4, wherein the set of packet destinations further includes the packet assembler module.

6. The system of claim 1, further comprising:
one or more secondary address resolution modules configured to resolve addresses of the second address type from packets of the second packet type, wherein an individual secondary address resolution module is configured to receive packets of the second packet type from an input port of the one or more second input ports.

7. The system of claim 6, wherein the one or more second input ports include at least two high-speed serial input ports.

8. The system of claim 6, further comprising:
one or more serial ATA (SATA) ports, and
a packet feeder module configured to generate packets of the second packet-type from information received by the one or more SATA ports and transmit the generated packets to the router module,
wherein the set of packet sources further includes the packet feeder module.

9. The system of claim 8, wherein the set of packet destinations further includes the packet feeder module and at least one of the one or more SATA ports.

10. The system of claim 8, further comprising a bus interface configured to exchange data between an external source or target and the packet feeder module or at least one of the one or more SATA ports.

11. The system of claim 10, wherein the bus interface includes a peripheral component interconnect express (PCIe) port.

12. The system of claim 6, wherein the one or more second input ports include an individual high-speed serial input port and the one or more second output ports include an individual high-speed serial output port, and the individual high-speed serial input port and the individual high-speed serial output port are physically combined in a bi-directional high-speed serial port.

13. The system of claim 4, wherein the first input port includes a gigabit Ethernet (GbE) input port, wherein the received packets of the first packet-type are Ethernet packets including Ethernet addresses, wherein the packet dicer module is configured to dice Ethernet packets, wherein the first output port includes a gigabit Ethernet (GbE) output port, and wherein the packet assembler module is configured to assemble Ethernet packets.

14. The system of claim 13, wherein the first input port and the first output port are physically combined in a bi-directional gigabit Ethernet port.

15. An information processing system comprising:
an on-chip information processing system comprising:
an Ethernet input port configured to receive Ethernet packets at a first data rate;
a packet dicer module configured to dice received Ethernet packets from the Ethernet input port into one or more packets of a second packet-type, wherein packets of the second packet-type include packet headers, wherein individual ones of the packet headers include an address of a second address-type;
an Ethernet output port configured to transmit Ethernet packets off the on-chip information processing system;
a packet assembler module configured to assemble Ethernet packets from one or more packets of the second packet-type for transmission through the Ethernet output port;
one or more input ports configured to receive packets of the second packet-type at a second data rate;
one or more output ports configured to transmit packets of the second packet-type at the second data rate, wherein the first data rate is faster than the second data rate; and
a router module configured to receive packets of the second packet-type from a set of packet sources and transmit packets of the second packet-type to a set of packet destinations, wherein the set of packet sources includes the packet dicer module, and the one or more input ports, and wherein the set of packet destinations includes the packet assembler module and the one or more of output ports; and
a set of packet processing engines configured to process packets of the second packet-type, wherein individual ones of the set of packet processing engines includes multiple ports.

16. The system of claim 15, wherein the on-chip information processing system further comprises:
one or more serial ATA (SATA) ports, and
a packet feeder module configured to generate packets of the second packet-type from information received by the one or more SATA ports and transmit the generated packets to the router module,
wherein the set of packet sources further includes the packet feeder module.

17. The system of claim 15, further comprising:
a network of connections between the multiple ports of individual packet processing engines, the one or more input ports, and the one or more output ports, wherein the connections are point-to-point connections configured to transfer packets of the second packet type.

18. The system of claim 16, wherein the set of packet destinations of the on-chip information processing system further includes the packet feeder module.

19. A system comprising:
a set of circuit devices, wherein individual ones of the circuit devices comprise:
- an Ethernet input port configured to receive Ethernet packets at a first data rate;
- a packet dicer module configured to dice received Ethernet packets from the Ethernet input port into one or more packets of a second packet-type, wherein packets of the second packet-type include packet headers, wherein individual ones of the packet headers include an address of a second address-type;
- an Ethernet output port configured to transmit Ethernet packets off the on-chip information processing system;
- a packet assembler module configured to assemble Ethernet packets from one or more packets of the second packet-type for transmission through the Ethernet output port;
- one or more input ports configured to receive packets of the second packet-type at a first data rate;
- one or more output ports configured to transmit packets of the second packet-type off the on-chip system at the second data rate, wherein the first data rate is faster than the second data rate; and
- a router module configured to receive packets of the second packet-type from a set of packet sources and transmit packets of the second packet-type to a set of packet destinations, wherein the set of packet sources includes the packet dicer module and the one or more input ports, and wherein the set of packet destinations includes the packet assembler module and the one or more output ports; and a set of packet processing engines configured to process packets of the second packet-type, wherein individual ones of the set of packet processing engines include multiple ports; and a network of connections between the set of circuit devices and the set of packet processing engines such that at least one individual packet processing engine has a port that is connected to one of the one or more input ports or the one or more output ports of at least one individual circuit device, wherein the connections are configured to transfer packets of the second packet-type.

20. The system of claim 18, wherein the on-chip information processing system further comprises a bus interface configured to exchange data between an external source or target and the packet feeder module or at least one of the one or more SATA ports.

21. The system of claim 19, wherein two or more of the set of packet processing engines are connected in a chain with a first packet processing engine of the chain coupled to a first circuit device of the set of circuit devices, wherein a packet received from the first circuit device is processed at each packet processing engine and forwarded to a next packet processing engine in the chain.

22. The system of claim 19, wherein each circuit device of the set of circuit devices is connected to at least another circuit device of the set of circuit devices, and wherein each circuit device set of packet processing engines is connected to at least one packet processing engine of the set of packet processing engines.

* * * * *

UNITED STATES PATENT AND TRADEMARK OFFICE
CERTIFICATE OF CORRECTION

| | |
|---|---|
| PATENT NO. | : 9,614,785 B1 |
| APPLICATION NO. | : 14/500694 |
| DATED | : April 4, 2017 |
| INVENTOR(S) | : Douglas A. Palmer |

Page 1 of 1

It is certified that error appears in the above-identified patent and that said Letters Patent is hereby corrected as shown below:

In the Claims

Column 11, Line 43, in Claim 7, delete "claim 6" and insert -- claim 1 -- therefor.

Column 11, Line 45, in Claim 8, delete "claim 6" and insert -- claim 1 -- therefor.

Column 11, Line 63, in Claim 12, delete "claim 6" and insert -- claim 1 -- therefor.

Signed and Sealed this
Fourth Day of July, 2017

Joseph Matal
*Performing the Functions and Duties of the*
*Under Secretary of Commerce for Intellectual Property and*
*Director of the United States Patent and Trademark Office*